(12) United States Patent
Hill et al.

(10) Patent No.: US 6,870,840 B1
(45) Date of Patent: Mar. 22, 2005

(54) DISTRIBUTED SOURCE LEARNING FOR DATA COMMUNICATION SWITCH

(75) Inventors: Rex A. Hill, San Diego, CA (US); Bryan Dietz, Lake Forest, CA (US); John Bailey, Agoura Hills, CA (US)

(73) Assignee: Alcatel, Paris (FR)

( * ) Notice: Subject to any disclaimer, the term of this patent is extended or adjusted under 35 U.S.C. 154(b) by 806 days.

(21) Appl. No.: 09/639,589

(22) Filed: Aug. 16, 2000

(51) Int. Cl.[7] .............................................. H04L 12/56
(52) U.S. Cl. ...................................... 370/389; 370/360
(58) Field of Search ................................ 370/401, 389, 370/402, 351, 357, 360, 362, 367, 387, 388

(56) References Cited

U.S. PATENT DOCUMENTS

| | | | |
|---|---|---|---|
| 6,101,188 A | | 8/2000 | Sekine et al. |
| 6,115,378 A | * | 9/2000 | Hendel et al. ............... 370/392 |
| 6,195,351 B1 | * | 2/2001 | Hiscock et al. ............. 370/389 |
| 6,310,878 B1 | * | 10/2001 | Bodnar ........................ 370/396 |

FOREIGN PATENT DOCUMENTS

| | | |
|---|---|---|
| EP | 0 887 970 A | 12/1998 |
| EP | 0 993 156 A | 4/2000 |
| WO | WO 99/00945 A | 1/1999 |

* cited by examiner

*Primary Examiner*—Kenneth Vanderpuye
(74) *Attorney, Agent, or Firm*—Michael Blaine Brooks PC; Craig A. Hoersten; V. Lawrence Sewell

(57) ABSTRACT

A method and apparatus for accomplishing source learning in a data switch of the type having a plurality of switching modules where each supports one or more external network devices and a backplane interconnecting the switching modules. Each switching module has logic resident thereon for performing distributed source learning, including configuring unknown source addresses "seen" in inbound packets and for notifying the other switching modules that such source addresses were "seen" on a port thereof. Address-port associations are thereby configured on the switch using distributed logic, i.e. without intervention by a centralized management entity. In regard to configuring destination addresses—when a destination address is unknown, packets are delivered over a multicast queue until the destination address is found. Once the destination address is found, a method of flow integrity is used to avoid out of order packet delivery when the device transitions from using a multicast flood queue to a unicast queue.

14 Claims, 7 Drawing Sheets

DISTRIBUTED SOURCE LEARNING FOR DATA COMMUNICATION SWITCH

FIELD OF THE INVENTION

The present invention relates to devices for source learning and, more particularly, to devices for distributed source learning in a data communication switch.

BACKGROUND OF THE INVENTION

Data communication switches interconnect network devices residing in different network domains. Such switches typically include a plurality of switching modules for switching data traffic between external network devices and a centralized management module for configuring the switching modules. Part of the switching module configuration is "source learning." Source learning is the process of dynamically learning associations between ports and the addresses of network devices they support by reviewing source addresses in inbound packets. By making such address-port associations, packets can be advantageously forwarded only on the ports of the switch supporting packet destinations rather than being "flooded" on all ports.

In a conventional source learning process, source addresses in packets are reviewed by a switching module upon ingress and unknown source addresses are submitted to the source learning function resident on a centralized management module for processing. The management module configures the address-port association on the switching modules such that future inbound packets destined to that address can be forwarded without unnecessary flooding.

While the source learning process has resulted in bandwidth savings in the form of reduced flooding, such savings have come at a price. Reliance on a centralized management entity for source learning has required a special internal protocol for flagging packets requiring source learning for capture by the management entity and has caused bottlenecks at the management module when many packets requiring source learning arrive at different switching modules within a short period of time.

SUMMARY OF THE INVENTION

The invention provides an efficient method and apparatus for accomplishing source learning in a data switch of the type having a plurality of switching modules, each supporting one or more external network devices and a backplane interconnecting the switching modules. Each switching module has logic resident thereon for performing distributed source learning, including configuring unknown source addresses "seen" in inbound packets and for making available or notifying the other switching modules that such source addresses were "seen" on a port thereof. Address-port associations are thereby configured on the switch using distributed logic, i.e. without intervention by a centralized management entity. Packets having unknown source addresses are replicated at the first switching module to enable packet forwarding across the backplane to proceed in parallel with source learning. Exchange of source learning information between switching modules is made "out of band" on a bus interconnecting the switching modules. Packets having unknown destination addresses are replicated at the first switching module where one copy is sent to a multicast queue for transmission and another copy is sent to a software module to find the destination address. Once the destination address is found, the multicast flow is interrupted, data is buffered for a period of time to ensure flow integrity (by keeping packets in correct order), and then the data flow is continued to a unicast queue for transmission.

These and other aspects of the invention can be understood by reference to the following detailed description, taken in conjunction with the accompanying drawings, which are briefly described below.

DETAILED DESCRIPTION

Figure 1:
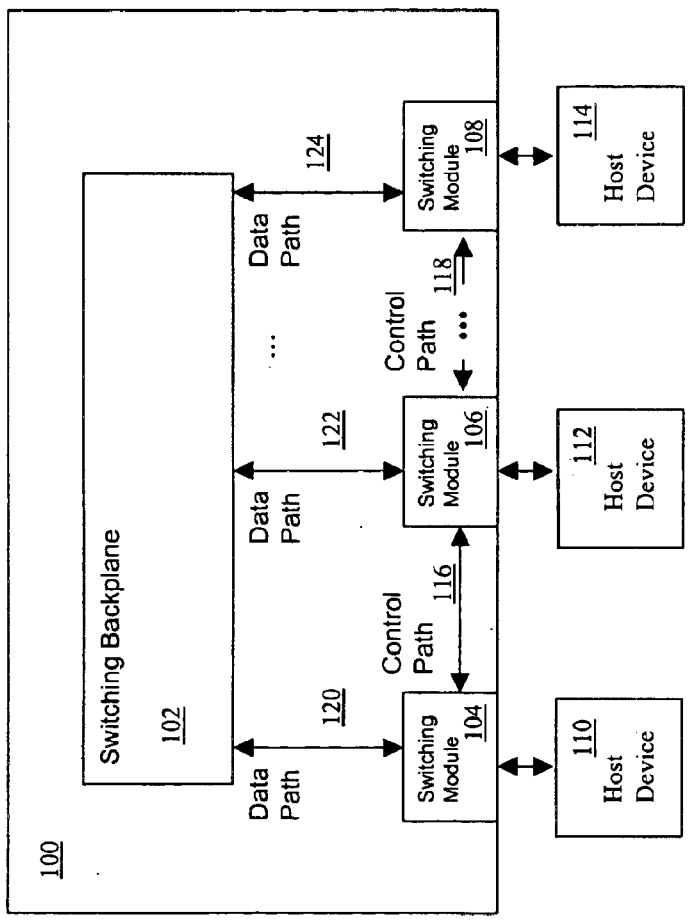
FIG. 1 is a diagram of an exemplary data communication switch.

FIG. 1 illustrates switch 100 in one embodiment of the present invention. Switch 100 includes switching backplane 102 driven by switching modules 104, 106, and 108, where switching module 104 is coupled to host device 110, switching module 106 is coupled to host device 112, and switching module 108 is coupled to host device 114. Additionally, switching modules 104 and 106 are coupled to each other by control path 116 and switching modules 106 and 108 are coupled to each other by control path 118. Each module 104, 106, and 108 interfaces with backplane 102 over data path 120, 122, and 124, respectively, to transmit packet data to backplane 102 and receive packet data from the backplane 102. For example, host device 110 preferably determines whether a destination device is on the same IP or IPX network by comparing its layer 3 addresses to the destination layer 3 address. If the destination address comparison indicates that the destination device is on the same network, an Address Resolution Protocol (ARP) message is sent from host 110 to retrieve the layer 2 address of the destination, and bridging is used to transmit the packet data. If the destination device is not on the same network, an ARP message is sent to retrieve the layer 2 default Media Access Control (MAC) address of the first router which will lead to the destination device, and routing is used to transmit the packet data. In the latter case, while the layer 2 default MAC address constantly changes to reflect the next router address leading to the destination device, the layer 3 UP destination address preferably stays constant to reflect where the packet is going.

Figure 2:
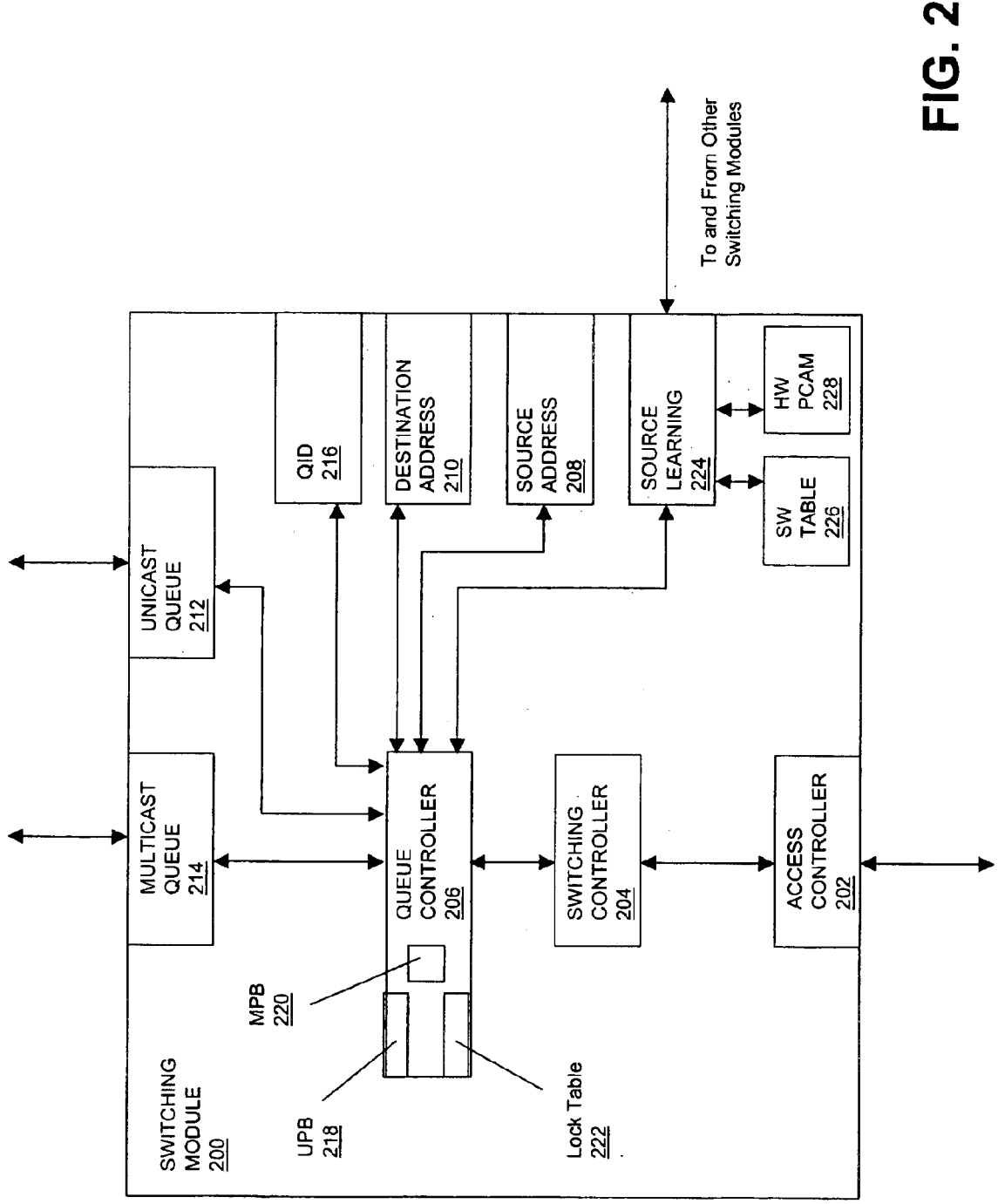
FIG. 2 is a diagram of an exemplary switching module within the data communication switch of FIG. 1.

FIG. 2 is a block diagram of switching module 200, which may be similar to switching module 104 of FIG. 1. Switching module 200 preferably has a source learning capability, which will be described in reference to FIG. 2. Module 200 includes access controller 202 coupled to switching controller 204. Access controller 202 receives packets from host devices, operates on them, and transmits them to switching controller 204. Access controller 202 also receives packets from switching controller 204, operates on them, and transmits them to host devices. Switching controller 204 is not only coupled to access controller 202 but is coupled to queue controller 206 as well. Switching controller 204, similar to access controller 202, receives packets from access controller 202, processes them, and transmits them to queue controller 206. Switching controller 204 also receives packets from queue controller 206, processes them, and transmits them to access controller 202. Queue controller 206 includes unicast packet buffer (UPB) 218, multicast packet buffer (MPB) 220 and lock table 222. Queue controller 206 is coupled to many elements, including source address resolution element (SARE) 208, destination address resolution element (DARE) 210, unicast queue 212, multicast queue 214, queue identification (QID) 216, and source learning element 224 (where source learning element 224 is coupled to software table 226 and pseudoCAM (PCAM) 228, which may be implemented in hardware, software, or both).

Queue controller 206 preferably receives a data packet from switching controller 204, SARE 208 determines whether the source address is known for the packet, DARE 210 determines whether the destination address is known for the packet, and QID 216 assigns a port number, priority, and bandwidth to the packet. Then, queue controller 206 stores the packet in unicast queue 212 or multicast queue 214 to be transmitted when its priority for the particular port is reached.

Source and Destination Conditions:

One embodiment of the present invention is a novel source learning technique using multiple switching modules coupled together on a single backplane. The single backplane architecture preferably allows for source learning and transmitting determinations to be made for packets having different source and destination conditions in a single-path. Packets with a known source address and a known destination address preferably are not sent to a source learning element and are transmitted to a unicast queue for transmission and forwarding. Packets with an unknown source address and a known destination address preferably are sent to the source learning element for source learning and concurrently transmitted to a unicast queue for transmission and forwarding. Packets with a known source address and an unknown destination address preferably are not sent to the source learning element and are transmitted to a multicast queue for transmission and forwarding. Packets with an unknown source and an unknown destination preferably are sent to the source learning element for source learning and concurrently transmitted to a multicast queue for transmission and forwarding.

Therefore, the source learning technique in this embodiment preferably processes the following four categories of packets in a single flow path: (1) known source address and known destination address; (2) unknown source address and known destination address; (3) known source address and unknown destination address; and (4) unknown source address and unknown destination address. In the case where the destination address is known, flow integrity typically is not an issue since the unicast queue normally is the only queue being used. In other embodiments, the source learning technique may use more than one flow path to process the four categories of packets.

Figure 3:
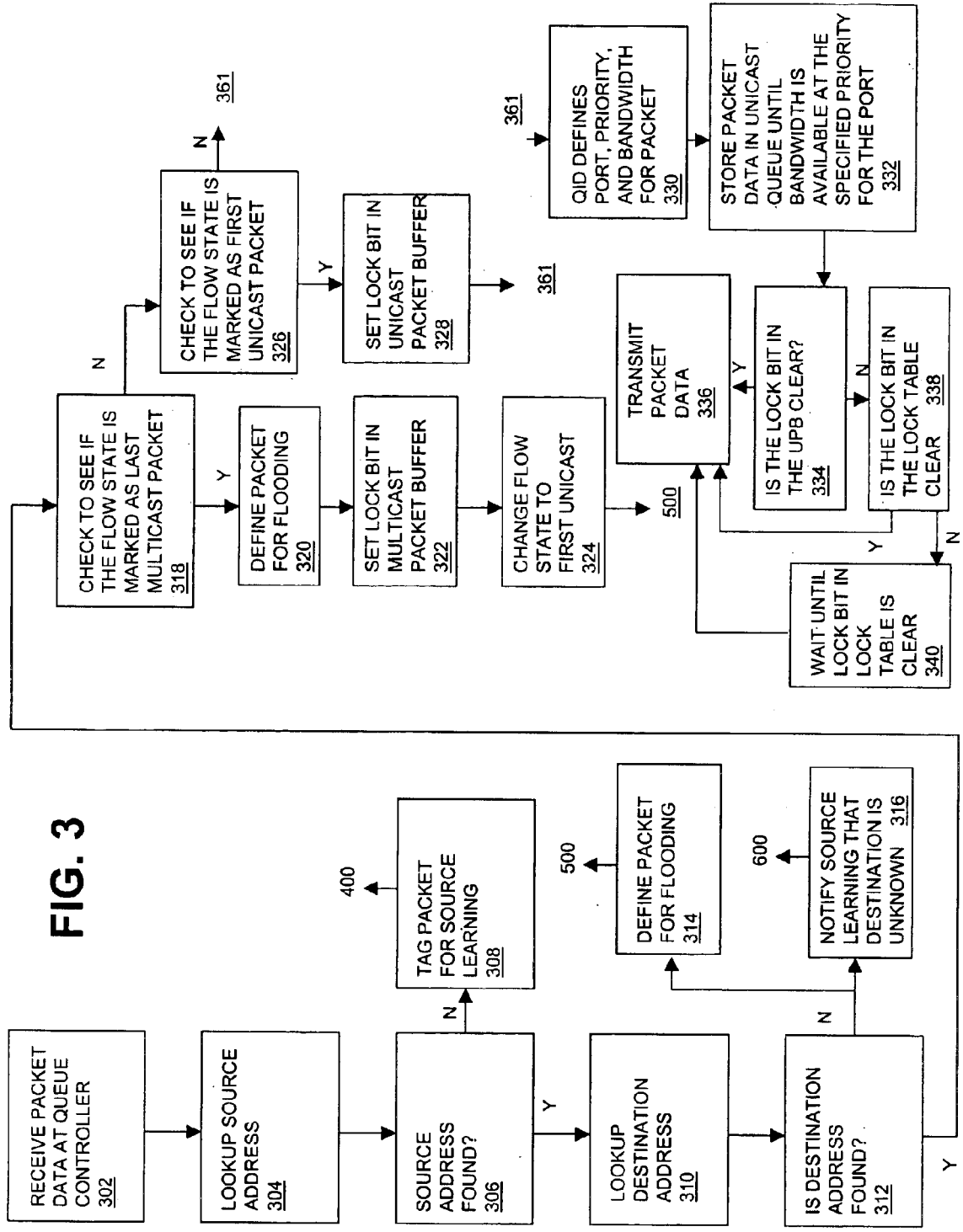
FIG. 3 is a flow diagram illustrating a source and destination indexing protocol for a known source and known destination according to FIG. 2.

Known Source and Known Destination:

Referring to FIG. 3, a packet is received at queue controller 206 (302) from switching controller 204. Upon receiving the packet, a lookup operation is performed to determine the source address in SARE 208 (304). If the source address is not found (306), the packet is tagged for source learning in source learning element 224 (308). If the source address is found (306), a lookup operation is performed to determine the destination address in DARE 210 (310). If the destination address is not found (312), the packet is defined for flooding (314) and source learning element 224 is notified (316) so that it can search for the destination address in the switching modules. If the destination address is found (312), as is the case here, the packet may follow one of the following three paths depending on the state of the destination address: last multicast packet path, first unicast packet path, and neither last multicast nor first unicast packet path. These paths ensure flow integrity for the packets. As a result, all multicast packets preferably are transmitted to this destination address before any unicast packets are transmitted there.

Last Multicast Packet Path:

Once the packet is found to have both its source and destination addresses associated with a port, queue controller 206 preferably performs a check to see if the flow state is marked as the last multicast packet (318). If the flow state is marked as the last multicast packet, thus indicating that the packet is defined for flooding (320), a lock bit is set in multicast packet buffer (MPB) 220 (322) internal to queue controller 206, and the flow state is changed from "last multicast packet" to "first unicast packet" (324). In such state, the packet is still flooded. Thus, referring to FIG. 5, QID 216 preferably defines the port for flooding and subsequently finds the priority and bandwidth to be applied to the packet (502). Additionally, to ensure that all multicast packets are transmitted to this destination address before any unicast packets are transmitted there, a lock bit in lock table 222 internal to queue controller 206 is set (504) when the lock bit is set in MPB 220 (506). If the lock bit is not set in MPB 220, the lock bit is not set in lock table 222 (506). In either case, the packet is thereafter stored in multicast queue 214 until the bandwidth is available at the specified priority for the port (508). Once bandwidth is available at the specified priority for the port, the packet is transmitted (510), the lock bit is cleared in lock table 222 (510) and the packet is tested to see if the source address is known (512). In this case, nothing more is done since the source address is known (514). If the source address were unknown, the packet would be sent to source learning element 224 (516).

First Unicast Packet Path:

Referring to FIG. 3, if the flow state is not marked as the last multicast packet (318), a test is performed to see if the flow state is marked as the first unicast packet (326). If, as in this case, the flow state is marked as the first unicast packet, a lock bit is set in a unicast packet buffer (UPB) 218 (328). Next, QID 216 preferably defines the port, priority, and bandwidth for the packet (330) and the packet is stored in unicast queue 212 until bandwidth is available at the specified priority for the port (332). Once bandwidth is available at the specified priority for the port, a check preferably is performed to see if the lock bit in UPB 218 is clear (334). If the lock bit in UPB 218 is clear, the packet is transmitted (336). As is the case here, the lock bit in the UPB 218 is set, and consequently, a test is performed to see if the lock bit in lock table 222 is clear (338). If the lock bit in lock table 222 is clear, the packet is transmitted (336). If the lock bit in lock table 222 is not clear, the packet is buffered until it is cleared by the transmission of the last multicast packet (340). Once the last multicast packet has been transmitted, then this packet is transmitted (336).

Neither Last Multicast nor First Unicast Packet Path:

Referring to FIG. 3, if the flow state is not marked as a last multicast packet or first unicast packet, the packet is forwarded to QID 216 so that the port, priority, and bandwidth can be defined for the packet (330) and the packet will be stored in unicast queue 212 until bandwidth is available at the specified priority for the port (332). Once bandwidth is available at the specified priority for the port, a check preferably is performed to see if the lock bit in UPB 218 is clear (334). If the lock bit in UPB 218 is clear, as is the case here, the packet is transmitted (336). If the lock bit in the UPB 218 is set, a test is performed to see if the lock bit in lock table 222 is clear (338). If the lock bit in lock table 222 is clear, the packet is transmitted (336). If the lock bit in lock table 222 is not clear, the packet is buffered until the lock bit in lock table 222 is cleared by the transmission of the last multicast packet (340). Once the last multicast packet has been transmitted, then this packet is transmitted (336).

Figure 4:
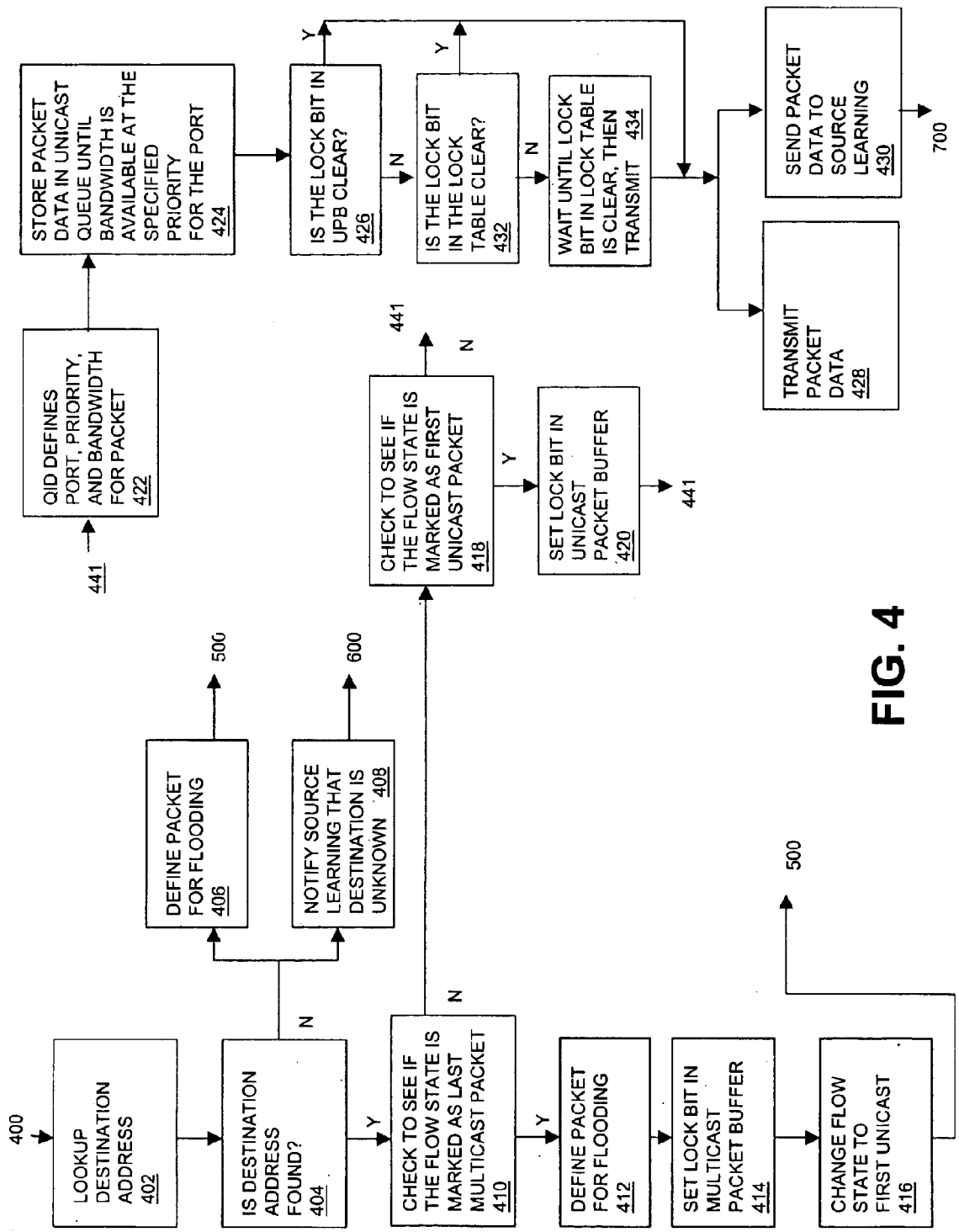
FIG. 4 is a flow diagram illustrating a source and destination indexing protocol for an unknown source and known destination according to FIG. 2.

Unknown Source and Known Destination:

Referring to FIG. 3, a packet is received at queue controller 206 (302) from switching controller 204. Upon receiving the packet, a lookup operation is performed to determine the source address in SARE 208 (304). If the source address is found (306), a lookup operation is performed to find the destination address (310). If the source address is not found (306), as is the case here, the packet is tagged for source learning in source learning element 224 (308). Referring to FIG. 4, after the packet is tagged for source learning (308), it is further processed so that a destination lookup (402) can be performed in DARE 210. If the destination address is not found (404), the packet is defined for flooding (406) and source learning 224 is notified so that it can search for the destination address (408). If the destination address is found, which is the case here, the packet may follow one of the following three paths depending on the state of the destination address: last multicast packet path, first unicast packet path, and neither last multicast nor first unicast packet path. These paths ensure flow integrity for the packets. As a result, all multicast packets preferably are transmitted to this destination address before any unicast packets.

Figure 7:
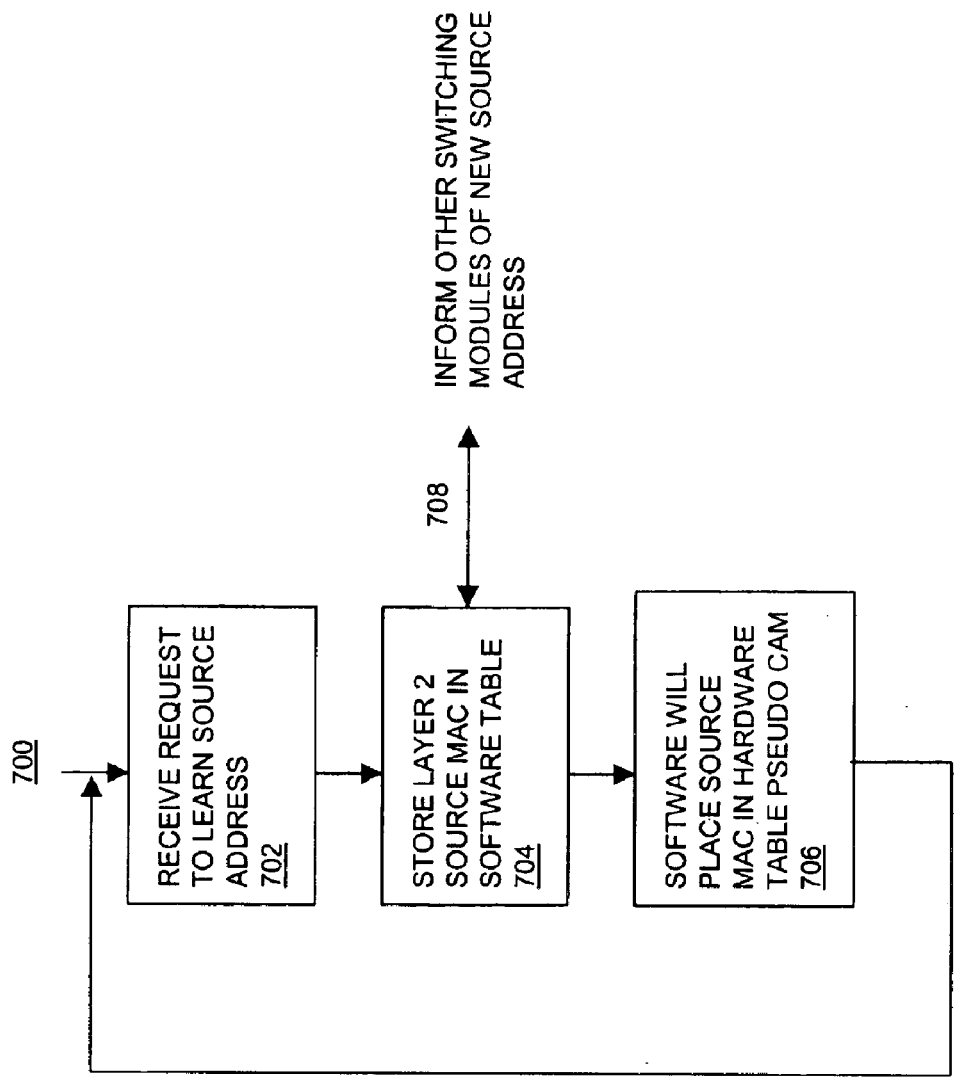
FIG. 7 is a flow diagram illustrating the source learning protocol associating the source address with a port.

Last Multicast Packet Path:

Once the packet is found to have an unknown source address and a known destination address, queue controller 206 preferably performs a check to see if the flow state is marked as the last multicast packet (410). If the flow state is marked as the last multicast packet, thus indicating that the packet is defined for flooding (412), a lock bit is set in MPB 220 (414) internal to queue controller 206 and the flow state is changed from last multicast packet to first unicast packet (416). In such state, the packet is still flooded. Thus, referring to FIG. 5, QID 216 preferably defines the port for flooding and subsequently finds the priority and bandwidth to be applied to the packet (502). Additionally, to ensure that all multicast packets are transmitted to this destination address before any unicast packets are transmitted to this destination address, a lock bit in lock table 222 internal to queue controller 206 is set (504) when the lock bit is set in MPB 220 (506). If the lock bit is not set in MPB 220, the lock bit is not set in lock table 222 (506). In either case, the packet is thereafter stored in multicast queue 214 until bandwidth is available at the specified priority for the port (508). Once bandwidth is available at the specified priority for the port, the packet is transmitted (510), the lock bit is cleared in lock table 222 (510) and the packet is tested to see if the source address is known (512). In this case, the source address is unknown and the packet is sent to source learning 224 (516) so that its source address can be associated with its particular port. Referring to FIG. 7, a request is received by source leaning 224 to learn a source address (702). Upon processing the request, a layer 2 source MAC which relates to a port is stored in a software table 226 (704). This software table 226 may be used for many things, for example, source learning 224 may use it to inform its own and/or other switching modules of a new source address and/or source learning 224 may use it to allow access for its own and/or other modules to read and/or write to the software table 226. Thereafter, source learning software in source learning element 224 will place the source MAC in a hardware table pseudo CAM 228 (706) and then will wait for another request to perform source learning. If the source address were known, the packet would not be sent to source learning element 224 (514) and nothing more would be done.

First Unicast Packet Path:

Referring to FIG. 4, if the flow state is not marked as the last multicast packet (410), a test is performed to see if the flow state is marked as the first unicast packet (418). If, as in this case, the flow state is marked as the first unicast packet, the lock bit is set in UPB 218 (420). Next, QID 216 defines the port, priority, and bandwidth for the packet (422) and the packet will be stored in unicast queue 212 until bandwidth is available at the specified priority for the port (424). Once bandwidth is available at the specified priority for the port, a check preferably is performed to see if the lock bit in UPB 218 is clear (426). If the lock bit in UPB 218 is clear, the packet is transmitted (428) and sent to source learning element 224 (430). As is the case here, the lock bit in the UPB 218 is set, and consequently, a test is performed to see if the lock bit in lock table 222 is clear (432). If the lock bit in lock table 222 is clear, the packet is transmitted (428) and sent to source learning 224 (430). If the lock bit in lock table 222 is not clear, the packet is buffered until the lock bit in lock table 222 is cleared by the transmission of the last multicast packet (434). Once the last multicast packet has been transmitted, then this packet is transmitted (428) and sent to source learning element 224 (430). The packet is sent to source learning 224 (700) so that its source address can be associated with its particular port. Referring to FIG. 7, a request is received by source learning 224 to learn a source address (702). Upon processing the request, a layer 2 source MAC which relates to a port is stored in a software table 226 (704). This software table 226 may be used for many things, for example, source learning 224 may use it to inform its own and/or other switching modules of a new source address and/or source learning 224 may use it to allow access for its own and/or other modules to read and/or write to the software table 226. Thereafter, source learning software in source learning element 224 will place the source MAC in a hardware table pseudo CAM 228 (706) and then will wait for another request to perform source learning.

Neither Last Multicast nor First Unicast Packet Path:

Referring to FIG. 4, if the flow state is not marked as a last multicast packet or first unicast packet, the packet preferably is forwarded to QID 216 so that the port, priority, and bandwidth can be defined for the packet (422) and the packet is stored in unicast queue 212 until bandwidth is available at the specified priority for the port (424). Once bandwidth is available at the specified priority for the port, a check preferably is performed to see if the lock bit in UPB 218 is clear (426). If the lock bit in UPB 218 is clear, as is the case here, the packet is transmitted (428) and sent to source learning element 224 (430). If the lock bit in the UPB 218 is set, a test is performed to see if the lock bit in lock table 222 is clear (432). If the lock bit in lock table 222 is clear, the packet is transmitted (428) and sent to source learning element 224 (430). If the lock bit in lock table 222 is not clear, the packet is buffered until the lock bit in lock table 222 is cleared by the transmission of the last multicast packet (434). Once the last multicast packet has been transmitted, then this packet is transmitted (428) and sent to source learning element 224 (430). The packet is sent to source learning 224 (700) so that its source address can be associated with its particular port. Referring to FIG. 7, a request is received by source learning 224 to learn a source address (702). Upon processing the request, a layer 2 source MAC which relates to a port is stored in a software table 226 (704). This software table 226 may be used for many things, for example, source learning 224 may use it to inform its own and/or other switching modules of a new source address and/or source learning 224 may use it to allow access for its own and/or other modules to read and/or write to the software table 226. Thereafter, source learning software in source learning element 224 will place the source MAC in a hardware table pseudo CAM 228 (706) and then will wait for another request to perform source learning.

Figure 6:
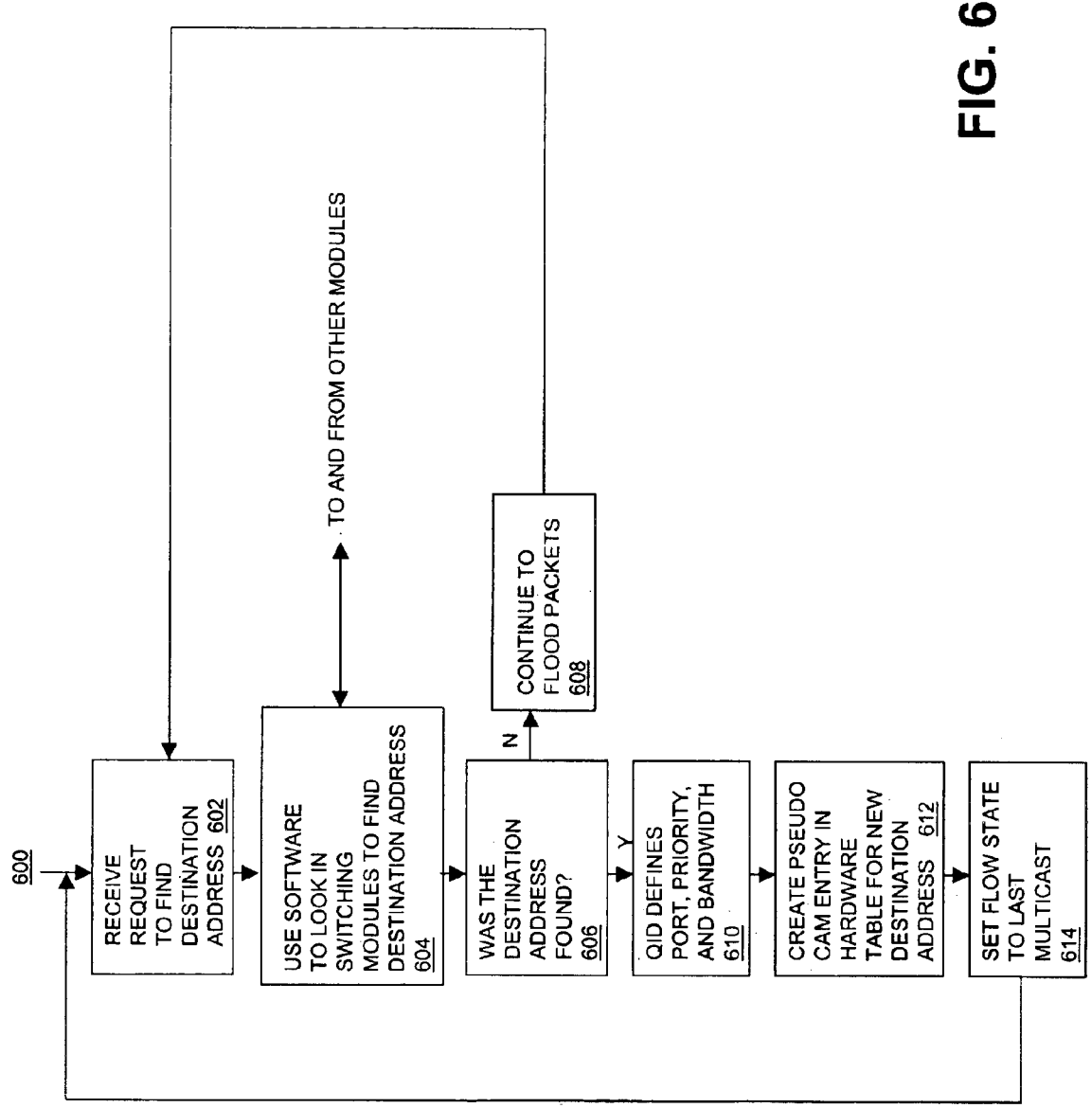
FIG. 6 is a flow diagram illustrating the source learning protocol acquiring the destination address according to FIG. 2.

Known Source and Unknown Destination:

Referring to FIG. 3, a packet is received at queue controller 206 (302). Upon receiving the packet, a lookup operation is performed to determine the source address 208 (304). If the source address is not found (306), the packet is tagged for source learning in source learning element 224 (308). If the source address is found (306), as is the case here, a lookup operation is performed to determine the destination address in DARE 210 (310). If the destination address is found (312), a check is performed to see if the flow state is marked as a last multicast packet (318). If the destination address is not found (312), as is the case here, the packet is defined for flooding (314) and source learning element 224 is notified so that it can search for the destination address in the switching modules (316). Referring to FIG. 6, source learning element 224 receives a request to find the destination address (602). Once the request has been received, source learning element 224 uses its software to look in its own modules and others to find the destination address (604). If the destination address is not found (606), the flood of packets are allowed to continue (608), a request to find the destination is again received (602), the software is used to search for the destination address (604), and a test is performed to see if the destination address was found this time (606). This process preferably continues until the destination address is found. If the destination address is found, QID 216 defines a port, priority, and bandwidth for the packet (610), an entry is created in PCAM 228 for the new destination address (612), and the flow state is set to last multicast (614) so that the last remaining packet is transmitted to this destination over multicast queue 214 before the first unicast packet is transmitted to this destination over unicast queue 2122.

Figure 5:
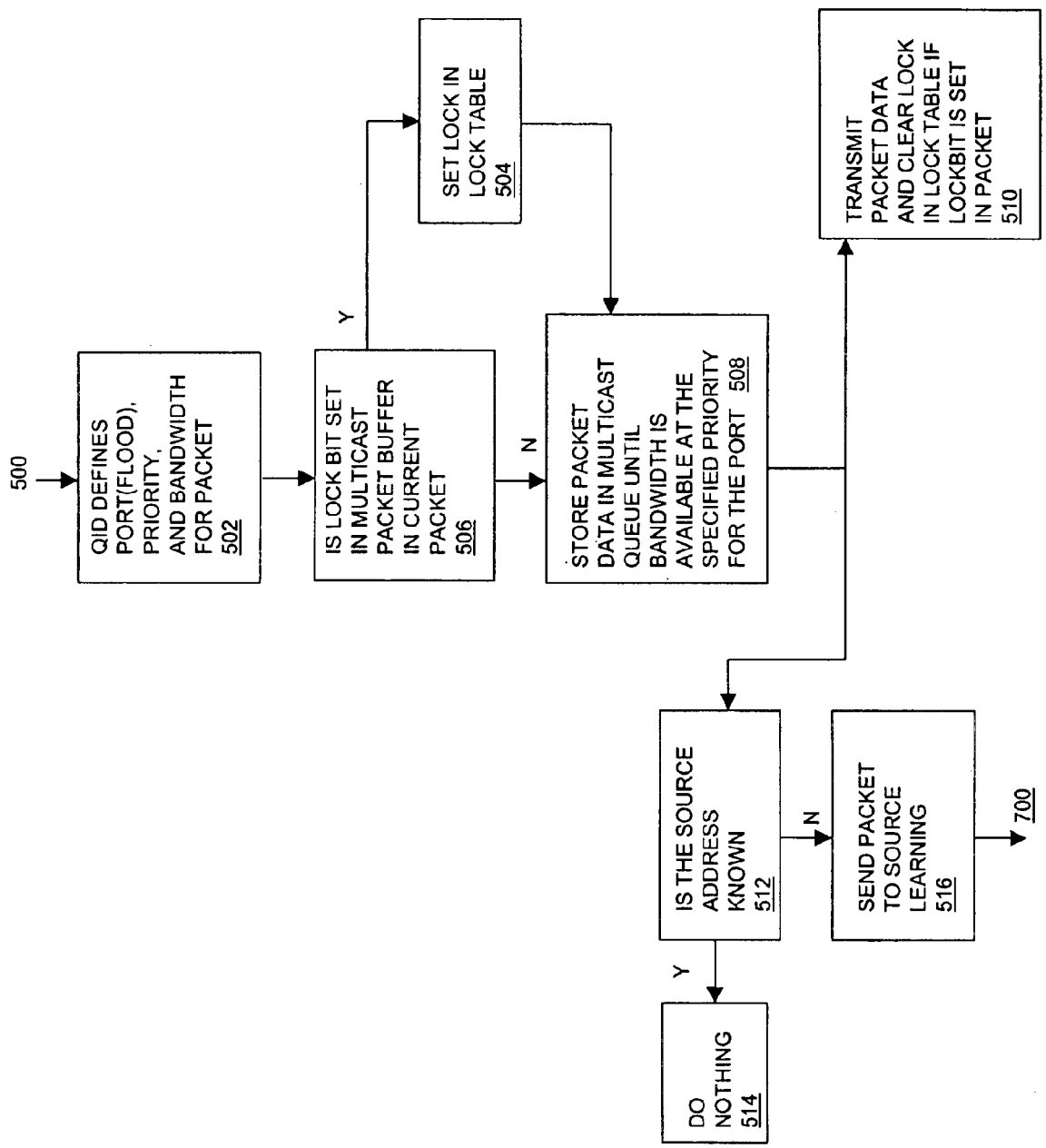
FIG. 5 is a flow diagram illustrating a source and destination indexing protocol for an unknown source and unknown destination and known source and unknown destination according to FIG. 2.

Referring to FIG. 5, after the packet is defined for flooding (314) and source learning element 224 is notified so that it can search for the destination address in the switching modules (316), QID 216 defines the port for flooding and subsequently finds the priority and bandwidth to be applied to the packet (502). Additionally, to ensure that all multicast packets are transmitted to this destination address before any unicast packets are transmitted there, a lock bit in lock table 222 internal to queue controller 206 is set (504) when the lock bit is set in MPB 220 (506). If the lock bit is not set in PUB 220, then the lock bit in lock table 222 is not set (506). In either case, the packet is thereafter stored in a multicast queue 214 until bandwidth is available at the specified priority for the port (508). Once bandwidth is available at the specified priority for the port, the packet is transmitted (510), the lock bit is cleared in lock table 222 (510), and the packet is tested to see if the source address is known (512). In this case, the source address is known and nothing more is done (514). If the source address is unknown, the packet is sent to source learning element 224 (516) so that the source address can be associated with its particular port.

Unknown Source and Unknown Destination:

Referring to FIG. 3, a packet is received at queue controller 206 (302). Upon receiving the packet, a lookup operation is performed to determine the source address 208 (304). If the source address is found (306), a lookup operation is performed to determine the destination address (310). If the source address is not found (306), as is the case here, the packet is tagged for source learning in source learning element 224 (308). Referring to FIG. 4, after the packet is tagged for source learning (308), it is further processed so that a destination lookup (402) can be performed in DARE 210. If the destination is found, the packet may follow one of three paths, depending on the state of the destination address. If the destination address is not found (404), as is the case here, the packet is defined for flooding (406) and source learning 224 is notified so that it can search for the destination address (408). Referring to FIG. 6, source learning element 224 receives a request to find the destination address (602). Once received, source learning element 224 uses its software to look in its own modules and others to find the destination address (604). If the destination address is not found (606), the flooding of packets is allowed to continue (608), a request to find the destination is again received (602), the software is used to search for the destination address (604), and a test is performed to see if the destination address was found this time (606). This process preferably continues until the destination address is found. If the destination address is found, QID 216 defines a port, priority, and bandwidth for the packet (610), an entry is created in PCAM 228 for the new destination address (612), and the flow state is set to last multicast (614) so that the last remaining packet is transmitted over multicast queue 214 before the first unicast packet is transmitted over unicast queue 212. Referring to FIG. 5, after the packet is defined for flooding (314) and source learning element 224 is notified so that it can search for the destination address in the switching modules (316), QID 216 will define the port for flood and will subsequently find the priority and bandwidth to be applied to the packet (502). Additionally, to make sure all multicast packets are transmitted to this destination address before any unicast packets are transmitted to this destination address, a lock bit in lock table 222 internal to queue controller 206 is set (504) when the lock bit is set in MPB 220 (506). If the lock bit is not set in MPB 220, then the lock bit in lock table 222 is not set (506). In either case, the packet is thereafter stored in a multicast queue 214 until bandwidth is available at the specified priority for the port (508). Once bandwidth is available at the specified priority for the port, the packet is transmitted (510), the lock bit is cleared in lock table 222 (510), and the packet is tested to see if the source address is known (512). In this case, the source address is unknown and the packet is sent to source learning 224 (516) so that its source address can be associated with its particular port. Referring to FIG. 7, a request is received by source learning 224 to learn a source address (702). Upon processing the request, a layer 2 source MAC which relates to a port is stored in a software table 226 (704). This software table 226 may be used for many things, for example, source learning 224 may use it to inform its own and/or other switching modules of a new source address and/or source learning 224 may use it to allow access for its own and/or other modules to read and/or write to the software table 226. Thereafter, source learning software in source learning element 224 will place the source MAC in a hardware table pseudo CAM 228 (706) and then will wait for another request to perform source learning. If the source address were known, the packet would not be sent to source learning element 224 (514) and nothing more would be done.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

We claim:

1. A switching module for a data communication switch having a plurality of switching modules interconnected over a backplane, comprising:

a first port for receiving packet data including a source address and a destination address;

means for checking whether a source association between the source address and the first port has been made;

means for making the source association and providing source association information to other switching modules, wherein the means for making the source association makes the source association when the source association has not been made;

means for checking whether a destination association between the destination address and a second port has been made; and means for making the association while current packets are flodded over a multicast queue.

2. The switching module of claim 1, wherein when the destination association has been made, packets are transitioned from traversing the multicast queue to a unicast queue.

3. A data communication switch, comprising:

a plurality of switching modules, each switching module comprising:

an access controller having one or more ports for receiving a packet including a destination address and source address;

a switching controller coupled to the access controller for receiving the packet from the access controller; and a queue controller coupled to the switching controller for receiving the packet from the switching controller, wherein the queue controller is adapted to transmit a first batch of one or more values to a first element in response to the packet, and receive a first port associated with the first batch of one or more values from the first element; transmit a second batch of one or more values to a second element in response to the packet, and receive a second port associated with the second batch of one or more values from the second element; transmit a third batch of one or more values to a third element in response to the packet, and receive a priority and a bandwidth from the third element in response to the third plurality of values; and transmit the packet using a unicast queue, the destination address, the second port, and the priority;

a backplane coupled to the switching modules for exchanging packet data originated by and destined to external network deices; and a control path coupled to the switching modules for exchanging control data originated by and destined to the switching modules wherein the control data includes information regarding associations between external network devices and ports of the data communication switch.

4. The data communication switch of claim 3, wherein the queue controller transmits a fourth batch of one or more values to a fourth element if the source address and first port association are not received in response to the first batch of one or more values, and wherein the queue controller receives the source address and first port association from the fourth element in response to the fourth batch of one or more values.

5. The data communication switch of claim 4, wherein the queue controller transmits the packet using a multicast queue and transmits a fifth batch of one or more values to the fourth element if the destination address and the second port association are not received in response to the second batch of one or more values, and wherein the queue controller receives the destination address and the second port association from the fourth element in response to the fifth batch of one or more of values, delays the packet flow, and transmits the packet using a unicast queue.

6. The data communication switch of claim 3, wherein the first batch of one or more values comprises a source address.

7. The data communication switch of claim 3, wherein the first element is a source address resolution element.

8. The data communication switch of claim 3, wherein the second batch of one or more values comprises a destination address.

9. The data communication switch of claim 3, wherein the second element is a destination address resolution element.

10. The data communication switch of claim 1, wherein the third batch of one or more values comprises one or more properties associated with the packet.

11. The data communication switch of claim 1, wherein the third element is a queue identifier element.

12. The data communication switch of claim 4, wherein the fourth batch of one or more values comprises a source address.

13. The data communication switch of claim 4, wherein the fourth element is a source learning element.

14. The data communication switch of claim 5, wherein the fifth batch of one or more values comprises a destination address.

* * * * *